United States Patent
He et al.

(10) Patent No.: US 12,375,959 B2
(45) Date of Patent: Jul. 29, 2025

(54) TRANSMISSION AND RECEPTION POINT CONFIGURATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 552 days.

(21) Appl. No.: 17/593,278

(22) PCT Filed: Oct. 14, 2020

(86) PCT No.: PCT/CN2020/120975
§ 371 (c)(1),
(2) Date: Sep. 14, 2021

(87) PCT Pub. No.: WO2022/077294
PCT Pub. Date: Apr. 21, 2022

(65) Prior Publication Data
US 2022/0312246 A1    Sep. 29, 2022

(51) Int. Cl.
*H04W 24/10*    (2009.01)
*H04W 36/00*    (2009.01)
(Continued)

(52) U.S. Cl.
CPC ....... *H04W 24/10* (2013.01); *H04W 36/0069* (2018.08); *H04W 72/1273* (2013.01); *H04W 72/54* (2023.01); *H04W 72/569* (2023.01)

(58) Field of Classification Search
CPC . H04W 24/10; H04W 72/1273; H04W 72/54; H04W 72/569; H04W 36/0069; H04W 36/0058; H04B 7/022; H04B 7/04
See application file for complete search history.

(56) References Cited

U.S. PATENT DOCUMENTS

| 10,715,951 B1* | 7/2020 | Ratasuk | G01S 5/08 |
| 2014/0010126 A1* | 1/2014 | Sayana | H04J 3/1694 |
| | | | 370/336 |

(Continued)

FOREIGN PATENT DOCUMENTS

| CN | 110249654 A | 9/2019 |
| CN | 110383722 | 10/2019 |

(Continued)

OTHER PUBLICATIONS

CATT, "Remaining issues on multi-TRP/panel transmission", 3GPP TSG RAN WG1 #99, R1-1912176, Nov. 9, 2019, 21 sheets.

*Primary Examiner* — Sudesh M. Patidar
(74) *Attorney, Agent, or Firm* — Fay Kaplun & Marcin, LLP (57) ABSTRACT

A user equipment (UE) is configured to report information to a base station that is used to configure multi-transmission and reception point (TRP) operation. The UE receives a multi-TRP configuration from the base station, wherein the multi-TRP configuration configures the UE with a primary TRP (P-TRP) and a secondary TRP (S-TRP), receives a measurement configuration from the base station, wherein the measurement configuration configures the UE to perform measurements associated with the P-TRP and the S-TRP, performs measurements associated with the P-TRP and the (Continued)

S-TRP based on the measurement configuration and transmits a measurement report including the measurements to the base station.

16 Claims, 4 Drawing Sheets

(51) Int. Cl.
  *H04W 72/1273* (2023.01)
  *H04W 72/54* (2023.01)
  *H04W 72/566* (2023.01)

(56) References Cited

U.S. PATENT DOCUMENTS

| | | | |
|---|---|---|---|
| 2019/0319686 A1* | 10/2019 | Chen, IV | H04W 24/08 |
| 2019/0379506 A1 | 12/2019 | Cheng | |
| 2020/0322940 A1* | 10/2020 | Pezeshki | H04B 7/063 |
| 2021/0014026 A1* | 1/2021 | Papasakellariou | H04L 1/1861 |
| 2021/0044932 A1* | 2/2021 | Kim | G01S 5/10 |
| 2021/0084546 A1* | 3/2021 | Awoniyi-Oteri | H04W 36/18 |
| 2022/0104108 A1* | 3/2022 | Landis | H04W 72/542 |
| 2023/0216627 A1* | 7/2023 | Wang | H04L 5/0053 370/329 |
| 2023/0216639 A1* | 7/2023 | Wang | H04L 5/0094 370/329 |
| 2024/0049033 A1 | 2/2024 | Kim et al. | |

FOREIGN PATENT DOCUMENTS

| | | | |
|---|---|---|---|
| CN | 113517965 | * | 4/2020 |
| CN | 111314952 | | 6/2020 |
| CN | 113965892 | * | 9/2023 |
| IN | 20204101693 | * | 4/2020 |
| WO | 2019/137412 A1 | | 7/2019 |
| WO | 2019/241912 | | 12/2019 |
| WO | 2020/145739 | | 7/2020 |
| WO | 2020/146829 A | | 7/2020 |

* cited by examiner

TRANSMISSION AND RECEPTION POINT CONFIGURATION

BACKGROUND

In 5G new radio (NR) wireless communications, the 5G NR network may utilize multi transmission and reception points (TRP) to improve reliability of the wireless channels. For example, multiple PDSCHs (e.g., two PDSCHs) may be scheduled for user equipment (UE) reception via multi-TRPs to improve the throughput of the UE.

SUMMARY

Some exemplary embodiments are related to a user equipment (UE) having a transceiver configured to communicate with a base station and a processor communicatively coupled to the transceiver and configured to perform operations. The operations include receiving a multi-transmission and reception point (TRP) configuration from the base station, wherein the multi-TRP configuration configures the UE with a primary TRP (P-TRP) and a secondary TRP (S-TRP), receiving a measurement configuration from the base station, wherein the measurement configuration configures the UE to perform measurements associated with the P-TRP and the S-TRP, performing measurements associated with the P-TRP and the S-TRP based on the measurement configuration and transmitting a measurement report including the measurements to the base station.

Other exemplary embodiments are related to a processor configured to perform operations. The operations include receiving a multi-transmission and reception point (TRP) configuration from the base station, wherein the multi-TRP configuration configures the UE with a primary TRP (P-TRP) and a secondary TRP (S-TRP), receiving a measurement configuration from the base station, wherein the measurement configuration configures the UE to perform measurements associated with the P-TRP and the S-TRP, performing measurements associated with the P-TRP and the S-TRP based on the measurement configuration and transmitting a measurement report including the measurements to the base station.

Still further exemplary embodiments are related to a base station having a transceiver configured to communicate with a user equipment (UE) and a processor communicatively coupled to the transceiver and configured to perform operations. The operations include transmitting a multi-transmission and reception point (TRP) configuration to the UE, wherein the multi-TRP configuration configures the UE with a primary TRP (P-TRP) and a secondary TRP (S-TRP), transmitting a measurement configuration to the UE, wherein the measurement configuration configures the UE to perform measurements associated with the P-TRP and the S-TRP; and receiving, from the UE, a measurement report including results from the measurements associated with the P-TRP and the S-TRP.

DETAILED DESCRIPTION

The exemplary embodiments may be further understood with reference to the following description and the related appended drawings, wherein like elements are provided with the same reference numerals. The exemplary embodiments describe a device, system and method for a user equipment (UE) to provide multi transmission and reception point (TRP) information to a next generation NodeB (gNB) of a 5G new radio (NR) wireless network for optimization of the TRP configuration for the UE.

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

Current configuration of TRPs for a UE do not take UE feedback into consideration. The exemplary embodiments consider UE feedback and measurements regarding the TRP operations for TRP selection, grouping, and release operations while also balancing the associated overhead for such UE feedback.

According to some exemplary embodiments, a UE may perform configured measurements associated with a primary TRP (P-TRP) and a secondary TRP (S-TRP) and report the measurement to the gNB for TRP selection, grouping, and/or reconfiguration by the gNB.

Figure 1:
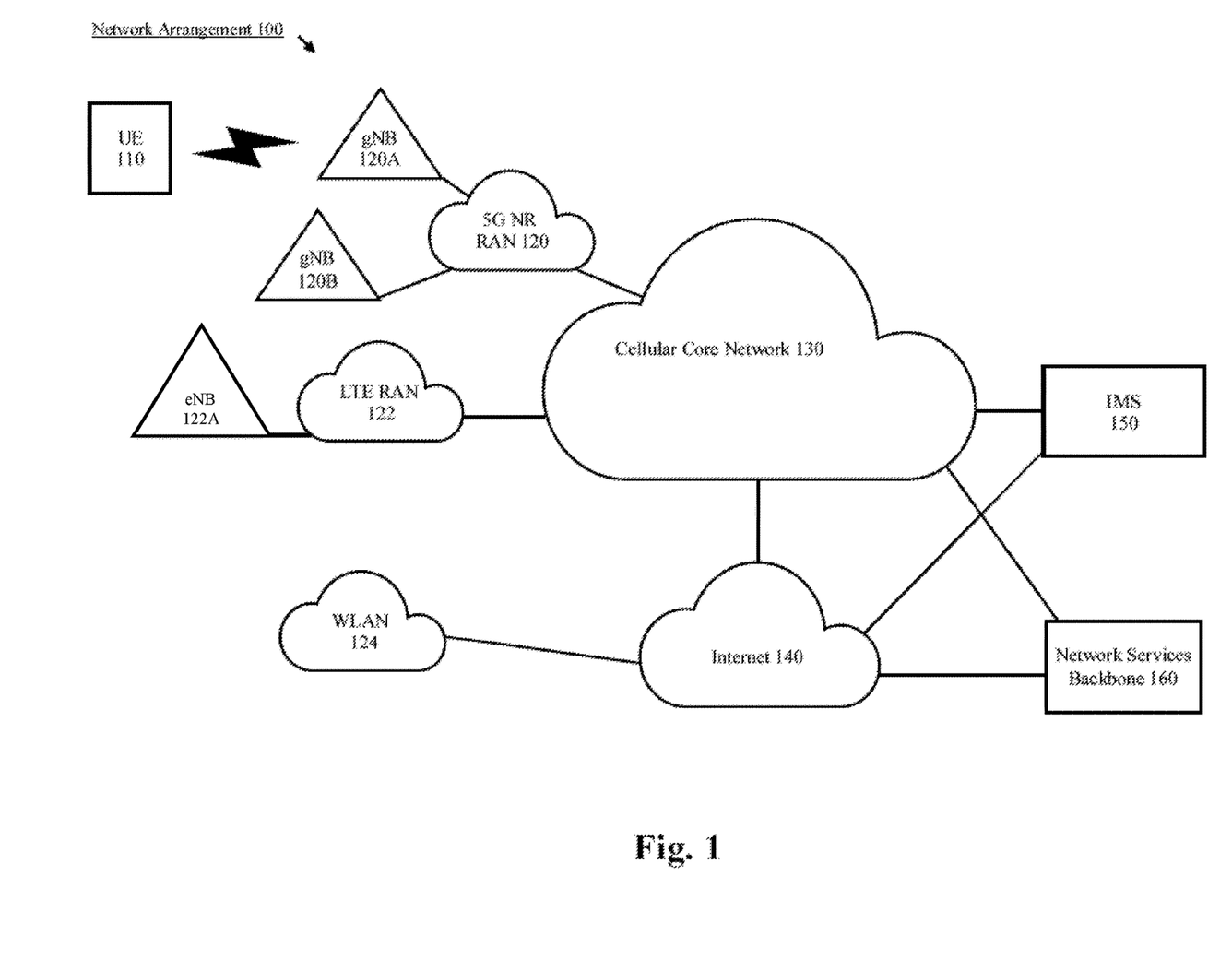
FIG. 1 shows an exemplary network arrangement according to various exemplary embodiments.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
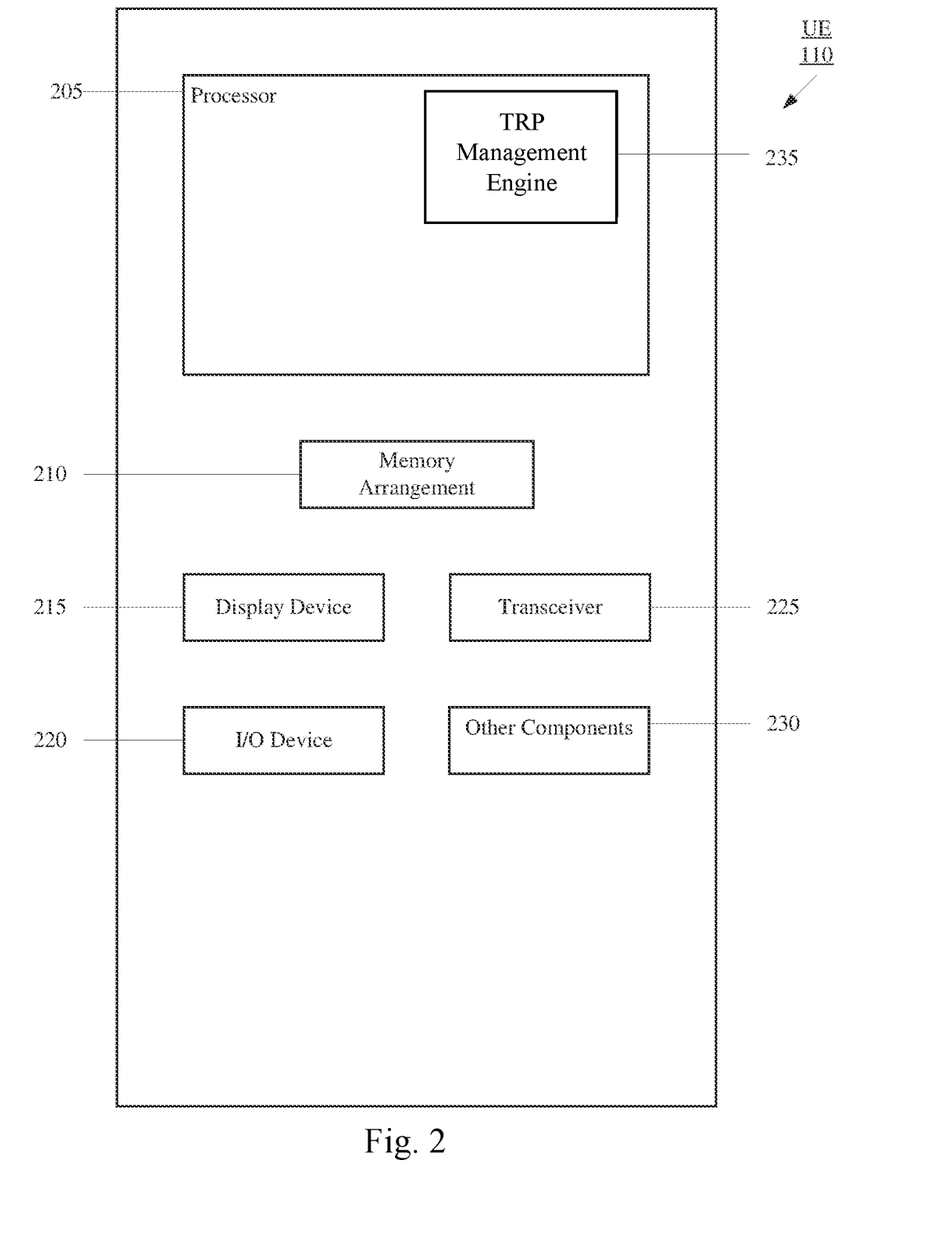
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a TRP management engine 235. The TRP management engine 235 may perform various operations related to performing measurements on TRP signals and reporting those measurements to the gNB 120a. Examples of this process will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
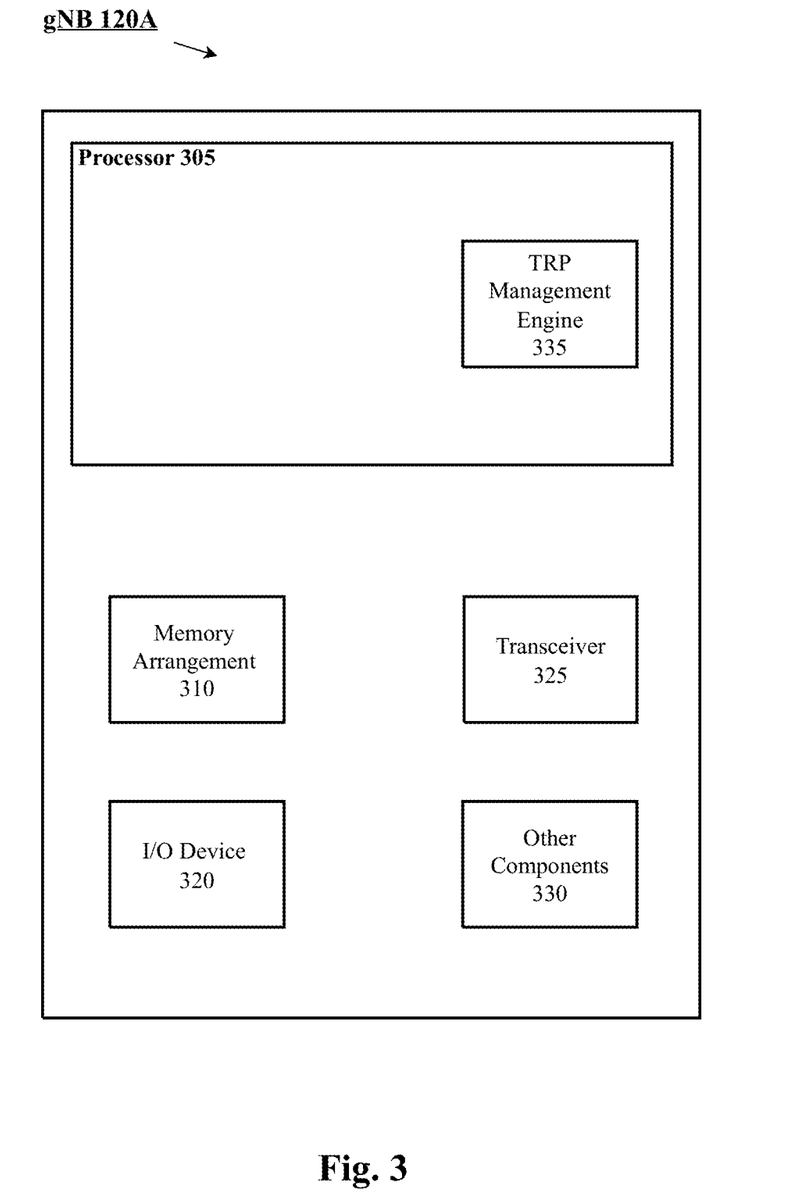
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a TRP management engine 335 for performing operations including configuring TRP groups for the UE 110, receiving measurements from the UE 110 associated with TRP signals and optimizing the TRP configuration based on those measurements. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
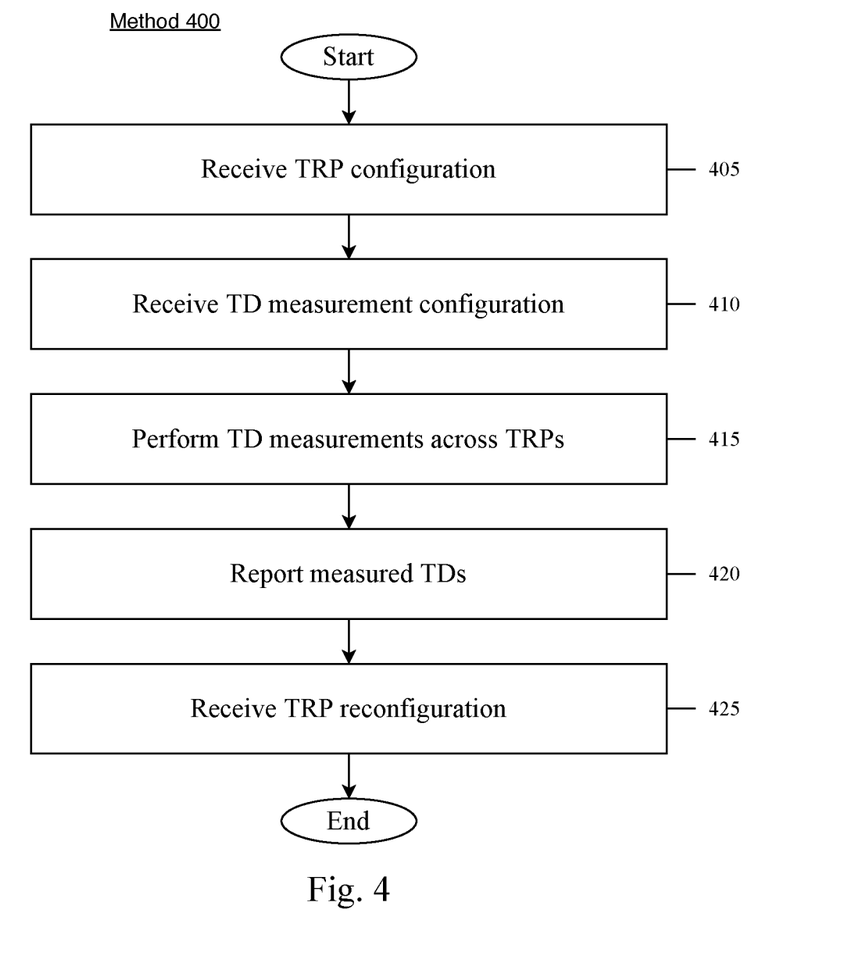
FIG. 4 shows a method of TRP configuration according to various exemplary embodiments.

FIG. 4 shows a method 400 of TRP configuration according to various exemplary embodiments. It should be noted that although the following description assumes the configuration of two TRPs (P-TRP and S-TRP), more TRPs may be configured for a UE 110. At 405, the UE 110 receives a TRP configuration from the gNB 120a. In some embodiments, the TRP configuration includes a P-TRP and a S-TRP. At 410, the UE 110 receives a time difference (TD) measurement configuration from the gNB 120a. Based on the TD measurement configuration, the UE 110 determines the radio frame TD between the P-TRP and the S-TRP (e.g., in $T_c$ units). In some embodiments, the TD measurement configuration is received as part of an radio resource control (RRC) reconfiguration with the report type set to "reportTD."

At 415, the UE 110 performs the TD measurements for the P-TRP and S-TRP radio frames. At 420, the UE 110 reports the measured TD(s) to the gNB 120a. In some embodiments, the TD reporting may be set to be periodic as configured by the gNB 120a. In some embodiments, the TD reporting may alternatively or additionally be triggered by an event. For example, in some embodiments, the triggering event is a change in the TD greater than a predetermined threshold value $\Delta T$ for all activated TRPs. In such embodiments, the UE 110 may report the TD and request that the gNB 120a reconfigure the TRP pair (or group) for the UE 110. In some embodiments, the triggering event may alternatively or additionally be the addition of the S-TRP. Once the gNB 120a adds the S-TRP, the UE 110 measures the TD and reports it back to the gNB 120a for validation purposes. In some embodiments, the TD reported at 420 (periodic or event triggered) may warrant a reconfiguration of the paired TRPs. As such, in some embodiments, at 425, the UE 110 receives a TRP reconfiguration from the gNB 120a for the reconfiguration of the TRP pair.

In some embodiments, to limit the frequency of TD reporting by the UE 110, a prohibitTDR-Timer may be defined and configured by gNB using higher layer signaling e.g. RRC on a per UE basis. The UE 110 may report the TD when the prohibitTDR-Timer expires or has expired. As a result, system resources are not strained by too frequent TD reporting by the UE 110.

The TD for TRPs that transmit channel state information resource signal (CSI-RS) resources and synchronization signal block (SSB) blocks of the UE's serving cell should be closely aligned to ensure that the UE 110 can use the same reception chain for receiving the physical downlink shared channel (PDSCH) transmissions from the P-TRP and S-TRP simultaneously. In some embodiments, the UE 110 jointly processes these two PDSCH transmissions using a single fast Fourier transform (FFT) on the set of samples and then separately de-mapped for post processing. In some embodiments, the maximum TD in multi-TRP may be defined at least based on the subcarrier spacing (SCS) for the P-TRP and the S-TRP. In some embodiments, the maximum TD for the P-TRP and the S-TRP is less than or equal to the length of the cyclic prefix.

In some embodiments, the UE 110 may process the PDSCH transmissions from P-TRP and S-TRP jointly (e.g., based on a single time-tracking loop) or separately (e.g., based on separate time-tracking loop). In some embodiments, the UE 110 may process the PDSCH transmissions from P-TRP and S-TRP jointly or separately based at least in part on the multi-TRP configuration received from the gNB 120a or an indication received from one of the TRPs via, for example, a DCI format (e.g., a flag). If, however, the TD exceeds a predetermined threshold, the UE 110 may cease monitoring or transmitting to the S-TRP.

In some embodiments, a multi-TRP measurement set may be parameterized in terms of CSI-RS resources, which are associated with different TRPs, instead of using a physical cell-ID or TRPs, which are purely physical entities. In such an embodiment, the multi-TRP measurement set may be configured by the gNB 120a via RRC in a UE-specific manner, thus making the measurement set independent of cell-IDs. Based on the measurement report, the gNB 120a is apprised of which TRP the UE 110 is trying to pair with. In some embodiments, the cell-ID may be configured as part of the multi-TRP measurement set (part of the configuration) if, for example, the CSI-RS or SSB from a non-serving cell is used as the measurement source.

In some embodiments, to facilitate measurement-based TRP selection, the UE 110 may be configured by the gNB 120a with a virtual cell-ID on a per SRS resource set basis for SRS sequence generation. That is, UL SRS resources are associated with different virtual cell-IDs. For example, in some embodiments, the UE 110 may be configured with at least two virtual cell IDs to associate different SRS resources sets with corresponding different TRPs for SRS transmissions. Based on the measurement report, the gNB 120a is apprised of which TRP the UE 110 is trying to pair with.

In some embodiments, more than one timing advance groups (TAG) may be configured for UEs of a serving cell or component carrier (CC) targeting different TRPs. Each TRP is associated with a TAG. If different TRPs schedule different UL transmissions, collisions between the transmissions are possible due to different timing advance (TA) values. In some embodiments, the UE 110 may be configured with a priority list for UL channels depending on the channel type and content so that the UE 110 can handle such collisions. As such, the UE 110 may drop or rate match lower priority channels when a collision occurs. In some embodiments, the priority may be defined as follows from highest priority to lowest priority: 1.) physical random access channel (PRACH) transmissions of the P-TRP, 2.) physical uplink control channel (PUCCH)/physical uplink shared channel (PUSCH) transmissions with acknowledgement (ACK)/negative acknowledgement(NACK) and/or scheduling request (SR) transmissions, 3.) PUCCH/PUSCH with other uplink control information (UCI), 4.) PUCCH/PUSCH without UCI, and 5.) sounding reference signal (SRS)/PRACH transmissions of the S-TRP.

Figure 5:
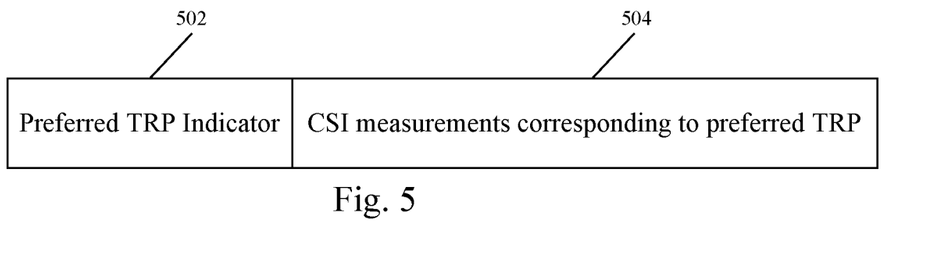
FIG. 5 shows an exemplary diagram illustrating a CSI report according to various exemplary embodiments.

With respect to CSI reporting, in some embodiments, CSI measurements and reporting by the UE 110 are limited to CSI-RS resources of a single TRP with a unique Physical Cell Id (PCI). As illustrated in FIG. 5, in some embodiments, the UE 110 may report a preferred TRP using a preferred TRP indicator 502 in the report and the CSI measurements 504 associated with the preferred TRP. As a result of this type of CSI reporting, the gNB 120a may select a TRP for DL transmissions for the UE 110.

In some embodiments, the UE 110 may be configured with multiple CSI-RS resources corresponding to multiple TRPs, possibly with different PCIs. In such a scenario, one CSI trigger state in scheduling downlink control information (DCI) Format may trigger the UE 110 to perform CSI reporting across multiple TRPs with different PCIs. Also in such a scenario, the UE 110 may concatenate the CSI reports prior to coding. In some embodiments, this concatenation may be performed first in increasing order of CSI reports and subsequently in increasing order of TRPs. In some embodiments, a single bit field may be added to the DCI Format 1_1 to dynamically switch between the single-TRP CSI feedback or the multi-TRP CSI feedback based on the current location of the UE 110.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
   a transceiver configured to communicate with a base station; and
   a processor communicatively coupled to the transceiver and configured to perform operations comprising:
   receiving a multi-transmission and reception point (TRP) configuration from the base station, wherein the multi-TRP configuration configures the UE with a primary TRP (P-TRP) and a secondary TRP (S-TRP);
   receiving a measurement configuration from the base station, wherein the measurement configuration configures the UE to perform measurements associated with the P-TRP and the S-TRP;
   performing measurements associated with the P-TRP and the S-TRP based on the measurement configuration, wherein the measurement configuration comprises a time difference (TD) measurement configuration, wherein the measurements comprise measurements of a TD between a same received radio frame transmitted by the P-TRP and the S-TRP, wherein, when the TD is greater than a predetermined value, the UE ceases monitoring the S-TRP and transmissions to the S-TRP; and
   transmitting a measurement report including the measurements and a TD measurement report to the base station.

2. The UE of claim 1, wherein the TD measurement report is one of (i) periodically transmitted to the base station, (ii) transmitted to the base station when a predetermined criterion is met or (iii) transmitted to the base station upon expiration of a timer.

3. The UE of claim 2, wherein the predetermined criterion comprises one of (i) a change in the TD more than a predetermined value or (ii) addition of the S-TRP.

4. The UE of claim 1, wherein the operations further comprise:
   processing a first physical downlink shared channel (PDSCH) from the P-TRP and a second PDSCH from the S-TRP.

5. The UE of claim 1, wherein measurement configuration includes parameterized channel state information reference signal (CSI-RS) resources, and wherein the measurement report comprises a CSI measurement report including CSI measurements based on the CSI-RS resources, and wherein configuration of the P-TRP and the S-TRP are based on the CSI measurement report.

6. The UE of claim 1, wherein the operations further comprise:
   receiving a virtual cell identifier (cell-ID) configuration from the base station for each of a plurality of sounding reference signal (SRS) resource sets, wherein each of the plurality of SRS resource sets is associated with an SRS transmission to a corresponding one of the P-TRP and the S-TRP.

7. The UE of claim 1, wherein, when a collision between two or more uplink transmissions from the UE to different TRPs has occurred, the operations further comprise:
   one of dropping or rate-matching lower priority channels of a predetermined prioritized channel hierarchy.

8. The UE of claim 1, wherein the measurement configuration comprises a CSI measurement configuration, wherein the measurement report comprises a CSI measurement report.

9. The UE of claim 8, wherein the CSI measurement configuration includes CSI-RS resources corresponding to one TRP, and wherein the CSI report includes a preferred TRP indicator and CSI measurements for a TRP selected by the UE as a preferred TRP.

10. The UE of claim 8, wherein the CSI measurement configuration includes CSI-RS resources corresponding to multiple TRPs, and wherein a scheduling downlink control information (DCI) triggers CSI reporting for the multiple TRPs in the measurement report.

11. A processor of a user equipment (UE) configured to:
   process a multi-transmission and reception point (TRP) configuration from a base station, wherein the multi-TRP configuration configures the UE with a primary TRP (P-TRP) and a secondary TRP (S-TRP);

process a measurement configuration from the base station, wherein the measurement configuration configures the UE to perform measurements associated with the P-TRP and the S-TRP;

perform measurements associated with the P-TRP and the S-TRP based on the measurement configuration, wherein the measurement configuration comprises a time difference (TD) measurement configuration, wherein the measurements comprise measurements of a TD between a same received radio frame transmitted by the P-TRP and the S-TRP, wherein, when the TD is greater than a predetermined value, the UE ceases monitoring the S-TRP and transmissions to the S-TRP; and generate, for transmission to the base station, a measurement report including the measurements and a TD measurement report.

12. The processor of claim 11, wherein the TD measurement report is transmitted to the base station upon expiration of a timer.

13. The processor of claim 11, wherein measurement configuration includes parameterized channel state information reference signal (CSI-RS) resources, and wherein the measurement report is a CSI measurement report including CSI measurements based on the CSI-RS resources, and wherein configuration of the P-TRP and the S-TRP are based on the CSI measurement report.

14. The processor of claim 11, wherein when a collision between two or more uplink transmissions from the UE to different TRPs has occurred, the processor is further configured to:

one of drop or rate-match lower priority channels of a predetermined prioritized channel hierarchy.

15. The processor of claim 11, wherein the measurement configuration is a CSI measurement configuration, wherein the measurement report is a CSI measurement report.

16. The processor of claim 15, wherein the CSI measurement configuration includes CSI-RS resources corresponding to one TRP, and wherein the CSI report includes a best TRP indicator and CSI measurements for a TRP selected by the UE as a best TRP.

* * * * *